(No Model.)
M. A. SHEPARD.
PENDULUM GATE.
No. 367,453. Patented Aug. 2, 1887.
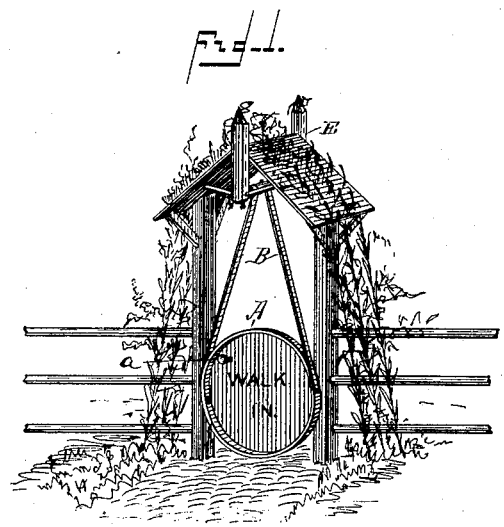
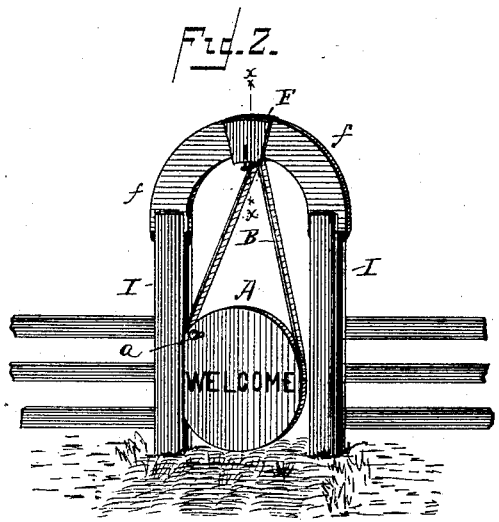
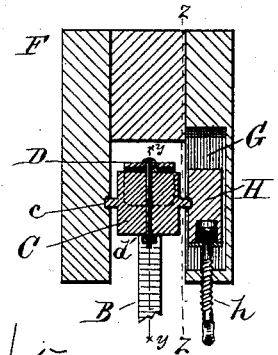
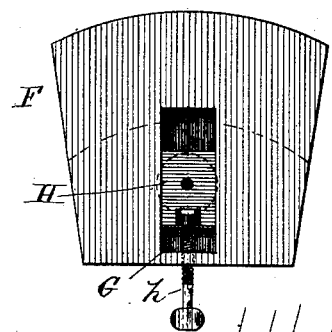
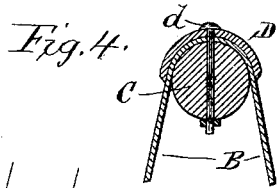
WITNESSES.
H. D. Nealy
Frank Aldrich
INVENTOR.
Morrill A. Shepard
By his Atty.
M. D. Peck

UNITED STATES PATENT OFFICE.

MORRILL A. SHEPARD, OF LEBANON, ILLINOIS.

PENDULUM-GATE.

SPECIFICATION forming part of Letters Patent No. 367,453, dated August 2, 1887.

Application filed February 23, 1887. Serial No. 228,513. (No model.)

*To all whom it may concern:*

Be it known that I, MORRILL A. SHEPARD, a citizen of the United States, residing at Lebanon, in the county of St. Clair and State of Illinois, have invented certain new and useful Improvements in Pendulum-Gates; and I do hereby declare the following to be a full, clear, and exact description of the invention, such as will enable others skilled in the art to which it appertains to make and use the same, reference being had to the accompanying drawings, which form part of this specification.

My invention relates to that class of devices that are so constructed as to be self-closing in the opening of a fence, arbor, or doorway; and the principal object is to construct a gate pivoted above the opening, so that it can be moved or swung to one side in passing, while by its own gravity it will then assume a position to close the opening, and also to make it so adjustable that it can be moved to one side of the fence should the posts become bent over and out of plumb or a vertical line.

Referring to the drawings, Figure 1 is a perspective view of my gate suspended in an arbor in a fence adapted to swing at the sides of the posts. Fig. 2 is a view showing it suspended from the key-block of an arch above sectional posts, adapted to swing between the sections of the posts. Fig. 3 is a section on line *x x* of Fig. 2, illustrating the means of suspending the gate at the top. Fig. 4 is a cross-sectional view on the line *y y* of Fig. 3, and Fig. 5 is a sectional view on the line *z z* of Fig. 3, showing the means of adjustment.

Like letters of reference refer to corresponding parts in each figure of the drawings.

A represents the gate, formed of sheet metal, wood, papier-maché, or other suitable material into a disk, single sheet or desired shape, with its edges turned over to form a re-enforce or blunt edge, and provided with a handle, *a*, and with a bail, B, attached to its sides or center, consisting of hoop-iron or other strong material, which extends upward and inward a sufficient distance to reach near to the top of the frame of the gateway or door-frame.

In the upper portion of the frame is a roller, C, having journals *c* pivoted in the frame, over which roller the bail B extends, and on top of the bail and roller there is placed a saddle, D, of metal, which extends over the bail and down on a portion of its sides to prevent wear and friction of the parts and the turning sidewise of the bail upon the roller. The roller, bail, and saddle are then secured together by a screw-bolt, *d*, to prevent their movement one upon the other while in operation. In Fig. 1 the roller C is shown journaled in two upright posts, E, attached to the frame, while in Fig. 2 it is journaled in a key-block, F, that unites the two sections of an arch, *f*, extending from the posts. In one of the posts E, or on one side of the key-block F, there is formed a vertical recess, G, in which is placed an adjustable block, H, adapted to be moved up and down by means of a screw-adjusting bolt, *h*. Within one side of this block H one end of the roller C is journaled, and is carried up or down as the block is moved, for the purpose of regulating the swing of the gate, by throwing it to one side of the posts and changing the line of oscillation, so that it can swing clear of them in case they become bent over or twisted.

The gate may be hung at one side of the center of the arbor or frame, as shown in Fig. 1, so that it will swing to one side of the posts of the fence; or it may be hung in the center of the frame, so that it will swing between the two sections I of the posts, as shown in Fig. 2.

The gate A may be made of polished sheet metal and have inscribed thereon in colored letters any desired motto or advertisement; or it may be painted black or any other desired color, and have the motto or advertisement in different colors.

Having fully described my invention, what I claim as new, and desire to secure by Letters Patent of the United States, is—

1. The combination, with a gateway having side supports and a roller journaled in said supports, of a gate composed of a piece or disk suspended from over the center of the opening to swing to either side and to automatically close itself, and a bail connecting said gate and roller, as set forth.

2. The combination, with a gateway-frame having an arch over its top, of a gate composed of a piece or disk having a bail secured to it and suspended on an adjustable journaled roller above the center of the opening, said gate being adapted to swing as a pendulum to either side, as set forth.

3. The combination, with a swinging gate secured to a roller above the opening of the gateway, of an adjustable block in a recess in which one end of the roller is journaled, said block being moved up and down by a screw-bolt, as and for the purpose set forth.

In testimony whereof I affix my signature in presence of two witnesses.

MORRILL A. SHEPARD.

Witnesses:
 H. D. NEALY,
 FRANK ALDRICH.